US011687251B2

(12) United States Patent
Greathouse et al.

(10) Patent No.: US 11,687,251 B2
(45) Date of Patent: Jun. 27, 2023

(54) DYNAMIC REPARTITION OF MEMORY PHYSICAL ADDRESS MAPPING

(71) Applicants: ADVANCED MICRO DEVICES, INC., Santa Clara, CA (US); ATI TECHNOLOGIES ULC, Markham (CA)

(72) Inventors: Joseph L. Greathouse, Austin, TX (US); Alan D. Smith, Austin, TX (US); Francisco L. Duran, Clearwater, FL (US); Felix Kuehling, Markham (CA); Anthony Asaro, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/487,247

(22) Filed: Sep. 28, 2021

(65) Prior Publication Data
US 2023/0097344 A1 Mar. 30, 2023

(51) Int. Cl.
  *G06F 12/00* (2006.01)
  *G06F 3/06* (2006.01)
  *G06F 12/06* (2006.01)

(52) U.S. Cl.
  CPC ............ *G06F 3/0619* (2013.01); *G06F 3/064* (2013.01); *G06F 3/0644* (2013.01);
  (Continued)

(58) Field of Classification Search
  CPC ...... G06F 3/0619; G06F 3/064; G06F 3/0644; G06F 3/0659; G06F 3/0673; G06F 12/0607
  (Continued)

(56) References Cited

U.S. PATENT DOCUMENTS

| 8,127,185 B2 | 2/2012 | Jeddeloh |
| 8,156,304 B2 | 4/2012 | Friedman et al. |

(Continued)

FOREIGN PATENT DOCUMENTS

| CN | 113296886 | * | 8/2021 |
| ES | 2386093 | * | 8/2012 |

(Continued)

OTHER PUBLICATIONS

International Search Report and Written Opinion dated Jan. 13, 2023 for PCT/US2022/044099, 10 pages.

*Primary Examiner* — Mardochee Chery

(57) ABSTRACT

Systems and methods for dynamic repartitioning of physical memory address mapping involve relocating data stored at one or more physical memory locations of one or more memory devices to another memory device or mass storage device, repartitioning one or more corresponding physical memory maps to include new mappings between physical memory addresses and physical memory locations of the one or more memory devices, then loading the relocated data back onto the one or more memory devices at physical memory locations determined by the new physical address mapping. Such dynamic repartitioning of the physical memory address mapping does not require a processing system to be rebooted and has various applications in connection with interleaving reconfiguration and error correcting code (ECC) reconfiguration of the processing system.

20 Claims, 9 Drawing Sheets

(52) U.S. Cl.
CPC .......... *G06F 3/0659* (2013.01); *G06F 3/0673* (2013.01); *G06F 12/0607* (2013.01)

(58) Field of Classification Search
USPC ........................................................ 711/154
See application file for complete search history.

(56) References Cited

U.S. PATENT DOCUMENTS

| | | |
|---|---|---|
| 8,301,938 B2 | 10/2012 | Cepulis et al. |
| 8,375,174 B1 | 2/2013 | Cartmell et al. |
| 2011/0047347 A1* | 2/2011 | Li .......................... G06F 3/0673 |
| | | 711/201 |
| 2011/0213945 A1 | 9/2011 | Post et al. |
| 2012/0151118 A1* | 6/2012 | Flynn .................... G06F 3/0619 |
| | | 711/170 |
| 2021/0026647 A1* | 1/2021 | Warkentin .......... G06F 12/1009 |

FOREIGN PATENT DOCUMENTS

| | | | | |
|---|---|---|---|---|
| ES | 2386093 T3 * | 8/2012 | ........ | H03M 13/1102 |
| JP | 2003202998 * | 7/2003 | | |
| JP | 2003202998 A * | 7/2003 | | |

\* cited by examiner

DYNAMIC REPARTITION OF MEMORY PHYSICAL ADDRESS MAPPING

BACKGROUND

To improve overall processing efficiency, processing systems typically employ multi-channel high bandwidth memory, such as multi-channel Dynamic Random Access Memory (DRAM). For example, such multi-channel memories are often implemented in a processing system such that multiple memory die are accessible in parallel by a host processor in the system. This multi-channel, parallel access typically increases the amount of data that the system is able to read or write in a given time period, allowing for reduced processing delays that in turn increase system performance.

Typically, the way in which data is written to memory devices, such as DRAM, is defined by a physical address mapping of the system, which maps physical addresses to corresponding physical blocks of memory of the memory devices. In conventional systems, to change the physical address mapping associated with one or more memory devices, the system must be rebooted. However, rebooting is typically time-consuming and risks boot errors or interruption of in-band mechanisms for system monitoring, which are of particular concern in high-performance processing systems.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Figure 1:
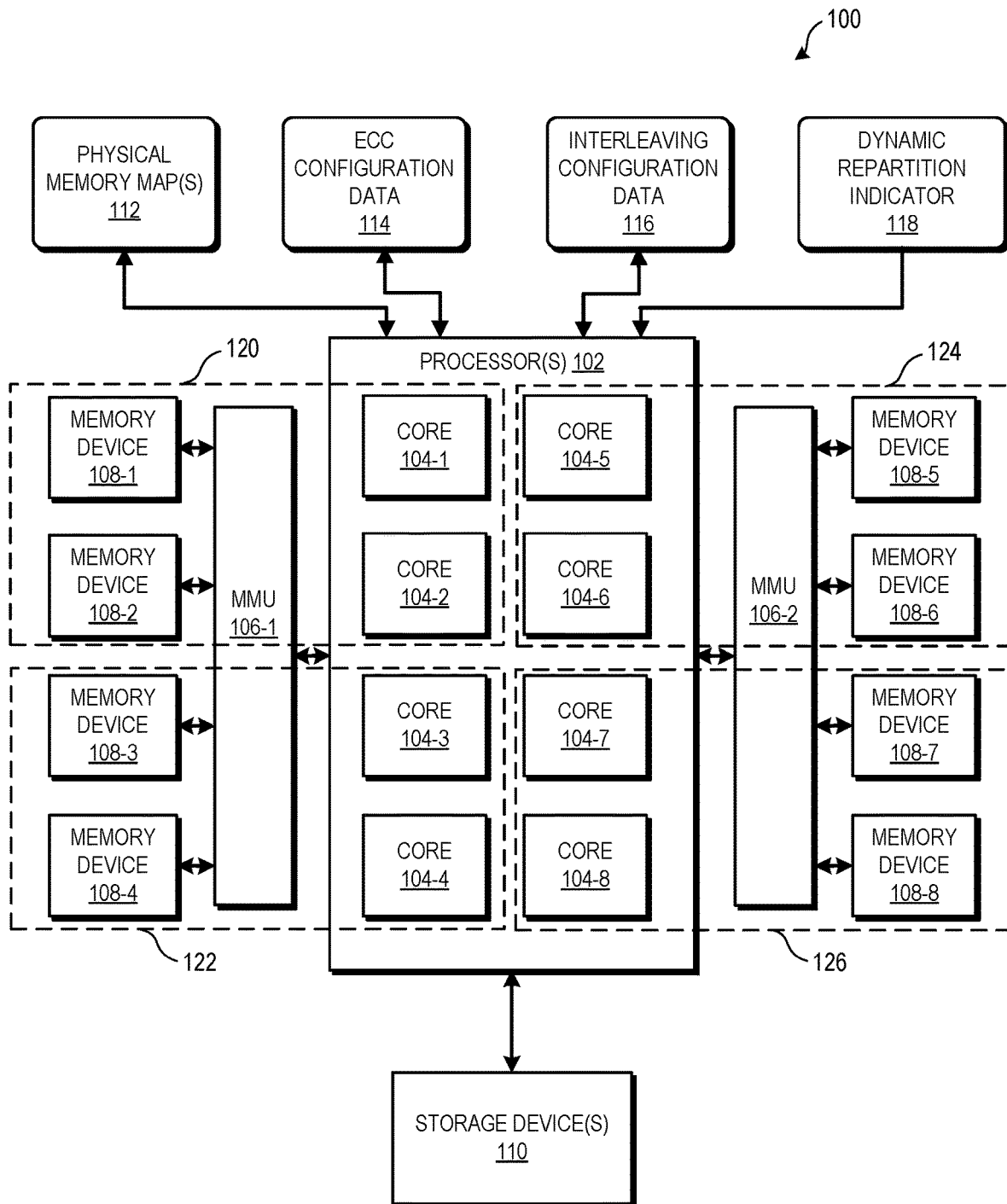
FIG. 1 is a block diagram of a processing system employing a dynamic physical address map repartitioning technique in accordance with some embodiments.

Repartitioning of the physical address mapping of memory devices, such as multi-channel DRAMs, is conventionally only performed upon a reboot of an associated processing system (i.e., at "boot time"). In the present context, repartitioning of the physical address mapping of one or more memory devices at boot time is referred to as "static" repartitioning. Embodiments of the present disclosure relate to "dynamic" repartitioning of the physical address mapping of one or more memory devices in which a reboot of at least a portion of the system is not required. Such dynamic repartitioning is performed, in some embodiments, by relocating at least a portion of the data stored at a given memory block or set of memory blocks of one or more memory devices, repartitioning the physical address mapping associated with those memory blocks in accordance with a new partitioning scheme, then moving the relocated data back onto the memory device(s) in an arrangement that conforms with the new partitioning scheme. The dynamic repartitioning is performed without requiring a reboot of the processing system, which reduces or removes the system downtime incurred by the reboot process required by conventional static repartitioning.

For example, because "critical" data, such as operating system (OS) data and page table data, is often stored in memory devices of a processing system, attempting to repartition such memory devices without rebooting the processing system can lead to errors or other instabilities in conventional processing systems. However, in embodiments of the present disclosure, "critical" memory locations (e.g., memory locations identified as storing critical data) within a given memory device are identified and dynamic repartitioning is disabled for these memory locations, which helps to ensure that critical data will not be lost during dynamic repartitioning. Because the risk of losing such critical data is mitigated or altogether avoided by disabling dynamic repartitioning for critical memory locations, memory devices storing such critical data can be dynamically repartitioned without requiring a reboot. Thus, the dynamic repartitioning schemes described herein facilitate repartitioning of the physical address mapping of memory devices and, in some embodiments, facilitates such repartitioning on a per-workload basis.

Processing systems typically include one or more memory devices, such as DRAMs, which include multiple memory cells, with contiguous groups of memory cells being referred to as memory blocks. Typically, a memory controller (e.g., a memory management unit (MMU)) of such a processing system maintains a physical address map that defines a mapping between physical addresses and physical locations (e.g., memory blocks) in one or more memory blocks of one or more memory devices of the processing system, such that the physical address map associates a given physical address with a particular physical location in a memory device of the processing system. The association between physical addresses and physical memory locations within a processing system is sometimes referred to herein as the "physical address mapping" or "physical memory address mapping" of the processing system. It is sometimes desirable to modify the physical address map, and such modification is, in some embodiments, performed in connection with a reconfiguration of the processing system. Modification of the physical address map is referred to herein as repartitioning of the physical address map. According to various examples, the physical address map for one or more memory devices of a given processing system is repartitioned when modifying an interleaving configuration associated with the memory devices, when modifying an error correcting code (ECC) configuration associated with the memory devices, or when enabling or disabling redundancy modes (e.g., a dual-modular redundancy mode or a triple-modular redundancy mode) for the processing system. It should be understood that physical address mapping, as used herein, does not refer to the mapping between virtual addresses and physical addresses, but instead refers to mapping between physical addresses and physical memory locations of the processing system.

In some instances, data, such as "critical" data (e.g., OS data or page table data), stored in a given memory device cannot be relocated without disrupting the operation of the processing system. Accordingly, in some embodiments described herein, dynamic repartitioning of the physical address map is disabled for at least a portion of the memory blocks of the memory devices, meaning that the data stored in such memory blocks is not relocated during dynamic repartition of the physical address map of the corresponding memory device(s). As an example, when dynamically repartitioning the physical address map of a processing system, first data stored on one or more memory devices at a first set of memory blocks is identified as eligible to be relocated to another memory device or storage device and then, in some embodiments, reloaded onto the one or more memory devices in accordance with a new physical address mapping if dynamic repartition is enabled for the first set of memory blocks. In contrast, second data stored on the one or more memory devices at a second set of memory blocks is not able to be relocated onto another memory device or storage device for dynamic repartition if dynamic repartition has been disabled for the second set of memory blocks.

FIG. 1 illustrates a processing system 100 that is configured for dynamic repartition of the physical address mapping for one or more memory devices. The processing system 100 includes one or more processors 102 having cores 104, one or more memory management units (MMUs) 106, memory devices 108 (e.g., DRAM devices, direct-mapped non-volatile memory devices, phase change memory devices, arbitrary Compute Express Link (CXL) attached memory devices, and the like), and one or more mass storage devices 110. As shown, the processor 102 is communicatively coupled to the memory devices 108 via two MMUs 106-1, 106-2.

Each of the MMUs 106 services memory access requests provided by the processor(s) 102, providing read/write access to the memory devices 108 and translating physical memory addresses provided in the memory access requests into physical memory locations (e.g., memory blocks) of one or more corresponding memory devices of the memory devices 108. In order to translate the physical memory addresses provided in such memory access requests, each MMU 106 maintains one or more physical memory maps 112 that define associations between physical memory addresses and physical memory locations within the memory devices 108. In some cases, one or more of the physical memory maps 112 is modified or otherwise repartitioned to accommodate a change in the configuration of the processing system 100.

Conventionally, in order to repartition a physical memory map for one or more memories of a processing system, the physical memory map must be repartitioned at boot time and, therefore, requires the corresponding processing system to be rebooted. However, having to reboot a processing system each time its physical memory map is to be modified or otherwise repartitioned is typically undesirable, as rebooting a processing system typically takes up excessive time (e.g., up to several minutes for more complex processing system s such as servers or supercomputers), and risks interrupting or causing errors in in-band mechanisms for monitoring such processing systems.

In the present example, the processing system 100 is configured such that the processor(s) 102, in conjunction with the MMUs 106, cause one or more of the physical memory maps 112 to be dynamically repartitioned, that is, in a manner that avoids the need for a system reboot. In some embodiments, the processor(s) 102 cause the physical memory maps 112 to be dynamically repartitioned responsive to the processor(s) 102 receiving or otherwise detecting a dynamic repartition indicator 118. To illustrate, the dynamic repartition indicator 118 can be asserted, indicating that dynamic repartition should be performed for all or a portion of one or more of the physical memory maps 112, responsive to a manual (i.e., user-initiated) or automated request for dynamic repartition of the physical memory map(s) 112. For example, such automated requests are generated responsive to the processor(s) 102 determining that a reconfiguration of the processing system 100 (also referred to herein as a "system reconfiguration") is to be performed, where the reconfiguration requires a reorganization of the way in which data is stored across physical locations of the one or more of the memory devices 108 without changing the physical addresses corresponding to the data. That is, the system reconfiguration requires all or a portion of one or more of the physical memory maps 112 to be modified to change existing physical address mappings defined by the physical memory maps 112 (sometimes referred to herein as "repartitioning" the physical memory address maps 112). Herein, the terms "physical address" and "physical memory address" are used interchangeably to refer to an address that points to or is otherwise associated with a particular physical memory location of a memory device. For example, such system reconfigurations include changes to the ECC configuration of the processing system 100 and changes to the interleaving configuration of the processing system 100, as described in more detail below.

In one example, the processing system 100 includes ECC configuration data 114 (stored at, for example, one or more of the mass storage devices 110), which defines particular physical memory locations of the memory devices 108 as being reserved for the storage of ECC. Typically, ECC is redundant information that is stored in association with other data in order to allow soft errors (typically corresponding, for example, to data corruption caused by radiation strikes, signal noise, and the like) in the other data to be detected and, in some instances, corrected. For example, block codes such as Reed-Solomon codes or Hamming codes are usable as ECC for providing error detection and correction for the memory devices 108. In some embodiments, the ECC configuration data 114 defines whether ECC for one or more of the memory devices 108, which determines whether memory blocks are reserved for ECC in those memory devices. For example, when the processing system 100 is reconfigured to enable or disable ECC or to change the ECC scheme used for one or more selected memory devices of the memory devices 108, the ECC configuration data 114 is updated to indicate that ECC is enabled or disabled for the selected memory devices or that the ECC scheme implemented at the selected memory devices is to be changed, and a dynamic repartition indicator is generated that identifies the selected memory devices for which the ECC configuration is to be changed. Such a change in the ECC configuration of the processing system 100 is referred to herein as an "ECC reconfiguration". The processor(s) 102 then cause data stored in some or all of the memory locations of the selected memory devices to be temporarily relocated to one or more other memory devices (that is, not one of the selected memory devices), to one or more of the mass storage devices 110 (which include, for example, one or more hard disk drives, solid-state drives, flash memories, or the like), or to both. In some embodiments, if only a subset of the memory locations of a given memory device 108 is affected by the ECC reconfiguration, and enough other memory locations are available (that is, are not presently storing data—are effectively "empty"), the relocated data is moved to a subset of the other available memory locations on the same memory device 108. This relocation of data out of memory locations that are to be affected by the ECC reconfiguration is considered part of the dynamic repartition of the physical memory map(s) 112.

It should be noted that the physical address mapping associated with memory locations of the memory devices 108 from which data is relocated is typically repartitioned as part of the dynamic repartitioning and ECC reconfiguration. For example, if enabling ECC for a given memory device 108, the processor(s) 102 determine one or more memory locations that are to be reserved for storing ECC data (as defined, for example, in the updated ECC configuration data 114, the dynamic repartition indicator, or both), and any data presently stored at these locations is temporarily relocated as described above. As another example, if disabling ECC for a given memory device 108, the processor(s) 102 determine one or more memory locations of the given memory device that are presently reserved for storing ECC data (as defined, for example, in the updated ECC configuration data 114, the dynamic repartition indicator, or both), but that will no longer be used to store ECC data after the ECC reconfiguration, and any data presently stored at these locations is deleted.

In some embodiments, after disabling ECC for the given memory device 108, the memory device 108 is defragmented to rearrange the data stored at physical memory locations of the memory device 108 such that "gaps" of empty memory caused by deleting the ECC data are grouped together. As an example, two logically adjacent sets of physical memory addresses, A and B, of the given memory device 108 are considered, with each set A and B including eight data pages (denoted by physical memory addresses A0, A1, A2, A3, A4, A5, A6, A7 and B0, B1, B2, B3, B4, B5, B6, B7, respectively) and one ECC page (denoted by physical memory addresses Aecc and Becc, respectively). In the present example, data associated with the physical memory addresses of the sets A and B is stored in a set of sequential memory blocks (e.g., according to a predefined interleaving pattern) in the following order: A0, A1, A2, A3, A4, A5, A6, A7, Aecc, B0, B1, B2, B3, B4, B5, B6, B7, Becc. Here, Aecc and Becc initially store ECC data for set A and set B, respectively. In the present example, upon performing an ECC reconfiguration to disable ECC for the memory device 108, the ECC data stored at the physical memory locations (memory blocks) associated with physical memory locations Aecc and Becc is deleted, and the memory device 108 is defragmented and its physical address mapping is modified in conjunction with the dynamic repartitioning techniques described herein such that the order in which data associated with the physical memory addresses is stored in the set of sequential memory blocks is A0, A1, A2, A3, A4, A5, A6, A7, B0, B1, B2, B3, B4, B5, B6, B7, Aecc, Becc. In this way, the physical memory addresses Aecc and Becc from which data was deleted (due to ECC being disabled for the given memory 108) are grouped into adjacent physical memory locations (memory blocks) at the "end" of the set of sequential memory blocks to reduce the occurrence of "gaps" (i.e., empty memory blocks) in the set of sequential memory blocks upon disabling ECC. Data stored at physical memory addresses that shifted to different physical memory locations in this way is temporarily relocated during the ECC reconfiguration, as described above.

As another example, if changing the ECC scheme implemented at a given memory device 108, the amount of memory space allocated for storing ECC data will typically change, which sometimes results in changes to the physical address mapping of the given memory device 108. For example, when performing an ECC reconfiguration of a given memory device 108 to change the ECC scheme used by the memory device 108 from an 8/9 ECC encoding where every 8 pages of data are ECC encoded using a 9th page of ECC data to a 128/130 ECC encoding scheme where every 128 pages of data are ECC encoded using 129th and 130th pages of ECC data, some or all of the data stored at the given memory device 108 is rearranged to accommodate the new ECC encoding scheme, resulting in modification to the physical memory address mapping for corresponding memory addresses and physical memory locations of the given memory device 108, and such data is relocated during the ECC reconfiguration as described above.

After identifying memory locations from which data is relocated for dynamic repartitioning, the processor(s) 102 repartition the physical memory map(s) 112 in accordance with the new ECC configuration Conventionally, repartitioning the physical memory map(s) 112 as part of any type of system reconfiguration would require that the processing system 100 be rebooted. However, by dynamically repartitioning the physical memory map(s) 112 in the present example, the ECC reconfiguration is performed without requiring a reboot of the processing system 100.

In another example, the processing system 100 includes interleaving configuration data 116 (stored, for example, as part of a basic input/output system (BIOS)-like structure or table, then loaded onto on-chip configuration registers during active operation of the processing system 100), which defines an interleaving pattern (e.g., a coarse-grain interleaving pattern, a fine-grain interleaving pattern, or a combination of these) according to which physical memory addresses are to be distributed across the memory devices 108. Examples of such interleaving patterns are described in more detail below in connection with FIGS. 3, 4, and 8. In some embodiments, the interleaving configuration of the processing system 100 is repartitioned, such that an existing interleaving pattern is replaced with a new interleaving pattern. Such a change in the interleaving pattern is sometimes referred to herein as an "interleaving reconfiguration".

For example, the processor(s) 102 will perform an interleaving reconfiguration of the processing system 100 responsive to one or more manual or automated requests that cause the interleaving configuration data 116 to be modified and that cause a corresponding dynamic repartition indicator 118 to be generated. As an example, a manual or automated request for changing the interleaving configuration such that a subset of the memory devices 108 are switched from a fine-grain interleaving configuration to a coarse grain interleaving configuration causes the processor(s) 102 to generate a corresponding dynamic repartition indicator 118 that defines the subset of the memory devices 108 as being selected for dynamic repartition. The processor(s) 102 then cause data stored on the subset of the memory devices 108 to be temporarily relocated to one or more other memory devices 108 (that is, one or more of the memory devices 108 that are not in the subset of memory devices selected for dynamic repartition), to the mass storage device(s) 110, or a combination of these. The processor(s) 102 then repartition the physical memory map(s) 112 such that the physical addresses identified in the physical memory map(s) 112 and associated with the subset the memory devices 108 selected for dynamic repartition are remapped from the fine-grain interleaving configuration to the coarse grain interleaving configuration in the repartitioned physical memory map(s) 112. In the present example, repartitioning the physical memory map(s) 112 advantageously does not require the processing system 100 to be rebooted, as any data that would typically be impacted by modifying or otherwise repartitioning the physical memory map(s) 112 has already been relocated out of the affected memory blocks at the time the physical memory map(s) 112 are repartitioned. The processor(s) 102 then load the relocated data back onto the memory devices 108 in accordance with the coarse grain interleaving configuration (now represented in the new physical address mapping of the repartitioned physical memory map(s) 112). The processor(s) 102 also modify the interleaving configuration data 116 to indicate that the subset of the memory devices 108 are in the coarse grain interleaving configuration, rather than the fine-grain interleaving configuration.

Further, in some embodiments, an interleaving reconfiguration involving dynamic repartitioning of the physical memory map(s) 112 is performed by the number of memory devices 108 across which a particular interleaving pattern is applied. In one example, the processor(s) 102 causes the memory devices 108 to be reconfigured from a global fine-grain interleaving pattern in which a single fine-grain interleaving pattern is applied across all of the memory devices 108 to a set of domain-level fine-grain interleaving patterns in which the memory devices 108 are logically organized into different domains, such as domains 120, 122, 124, and 126, and a respective fine-grain interleaving pattern is applied to the memory devices 108 within each domain. When performing such an interleaving reconfiguration, the processor(s) 102 cause data stored in the memory devices 108 to be temporarily relocated to other memory devices, one or more of the mass storage devices 110, or a combination of these, then repartition the physical memory map(s) 112 in accordance with the new domain-level fine-grain interleaving patterns, then loads the relocated data onto the memory devices 108 in accordance with the new domain-level fine-grain interleaving patterns and updates the interleaving configuration data 116 to indicate the new domain-level fine-grain interleaving patterns are applied to the memory devices 108.

In some embodiments, an interleaving reconfiguration for transitioning from a global fine-grain interleaving configuration to a set of domain-level fine-grain interleaving configurations is executed by the processor(s) 102 responsive to the processor(s) 102 identifying a non-uniform memory access (NUMA)-aware workload that is to be processed by one or more of the cores 104 of the processor(s) 102. For example, some workloads leverage, or are otherwise aware, of a NUMA configuration that is, in some embodiments, employed by the processing system 100. In the present example, such workloads are referred to as "NUMA-aware" workloads. Such NUMA-aware workloads are typically optimized to place data at particular physical memory locations based on the expected frequency with which the data will be used and the proximity of the physical memory locations to the processor core(s) executing the corresponding workload. For example, data that is expected to be used more frequently when executing the NUMA-aware workload is stored in memory devices 108 that are physically closer to the processor core(s) 104 executing the NUMA-aware workload (i.e., the memory devices 108 that are in the same domain as those processor core(s) 104), while data that is expected to be used less frequently when executing the NUMA-aware workload is stored in memory devices 108 that are physically further away from the processor core(s) 104 executing the NUMA-aware workload (i.e., the memory devices 108 that are in a different domain from that of the processor core(s) 104).

In some embodiments, one or more memory locations (i.e., memory blocks) of a given memory device are reserved for data that is critical to the operation of the processing system 100 (e.g., OS data, page table data, and the like). Such memory locations are sometimes referred to herein as "critical memory locations" or "critical memory blocks". In some embodiments, dynamic repartitioning is disabled for such critical memory locations, as temporarily relocating the data stored therein would risk destabilizing the operation of the processing system 100. For example, if, during dynamic repartitioning, the data of a critical memory location storing OS data were to suddenly be relocated, this would likely result in an unexpected shutdown of the processing system or an error that could otherwise inhibit the function of the processing system, as such OS data is typically required in order for the processing system to properly execute corresponding OS software.

As another example, consider a memory device 108-1 that includes one or more critical memory locations that store critical data, where dynamic repartitioning of the physical memory address mapping is disabled for such critical memory locations. When performing a dynamic repartition of the physical memory map(s) 112 associated with the memory device 108, only memory locations of a first subset of the memory locations of the memory device 108-1 that are not critical memory locations (that store, for example, user data or job data) are identified as eligible for dynamic repartitioning and are identified as eligible for the corresponding temporary relocation of the data stored thereon (i.e., dynamic repartitioning is enabled for the memory locations of the first subset). In contrast, memory locations of a second subset of the memory locations of the memory device 108-1, which include the critical memory locations, are identified as not eligible for dynamic repartitioning and are identified as not eligible for the corresponding temporary relocation of the data stored thereon (i.e., dynamic repartitioning is disabled for the memory locations of the second subset).

By disabling dynamic repartitioning of the physical memory address mapping for critical memory locations, as provided in the preceding example, associated risks of failure of operation of the processing system 100 are mitigated or altogether avoided.

Figure 2:
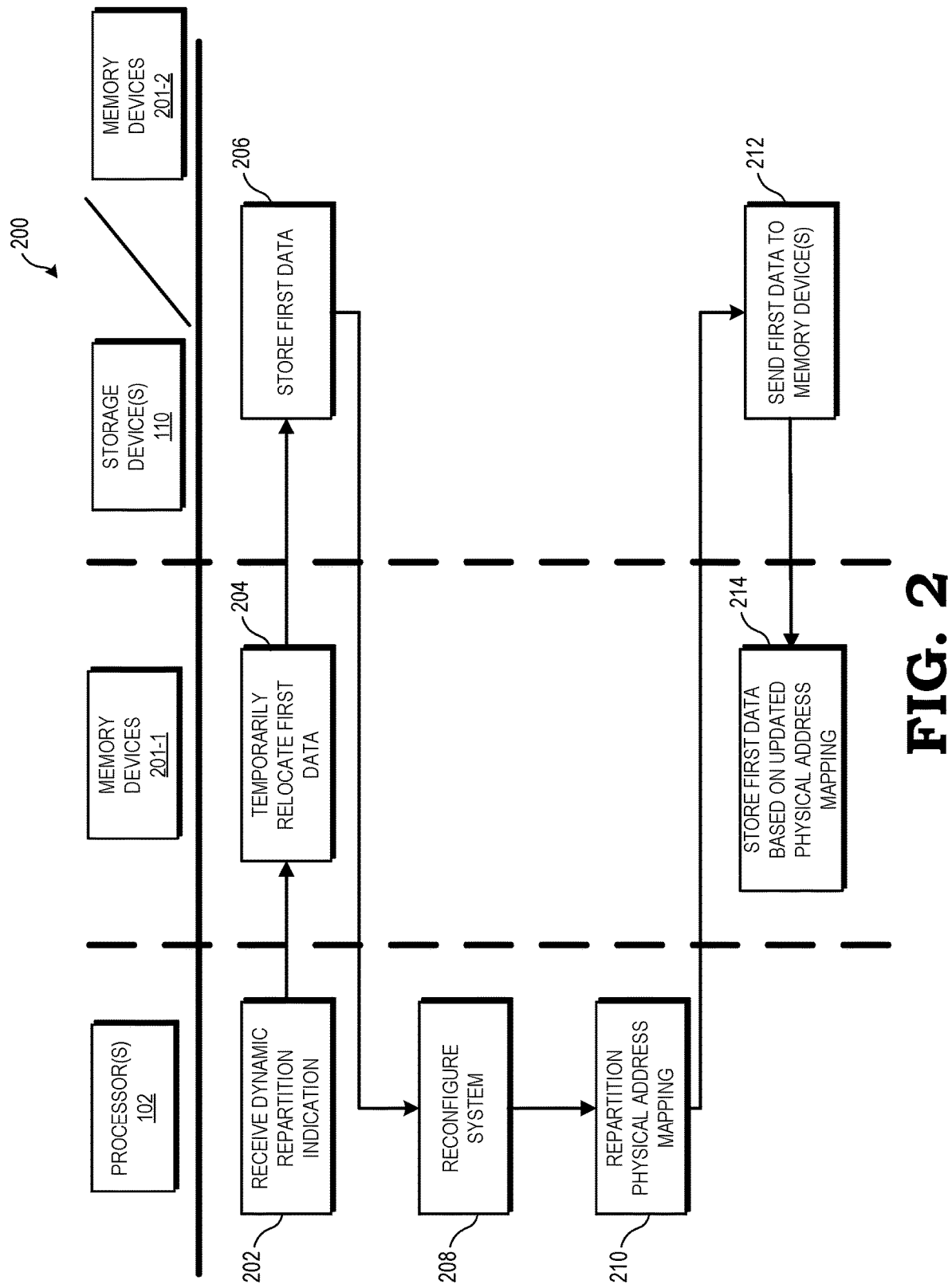
FIG. 2 is a flow diagram illustrating a method of dynamically repartitioning memory physical address mapping, in accordance with some embodiments.

FIG. 2 illustrates a method 200 of dynamically repartitioning a physical memory address mapping for a processing system. For ease of illustration, the method 200 is described with respect to an example implementation of the processing system 100 of FIG. 1 and its constituent components and modules.

At block 202, the processor(s) 102 receive a dynamic repartition indication, such as an embodiment of the dynamic repartition indication 118. In some embodiments, the dynamic repartition indication is generated as part of a broader system reconfiguration that is to be executed by the processor(s) 102, such as an ECC reconfiguration or an interleaving reconfiguration. In some embodiments, the dynamic repartition indication identifies a subset of memory devices, denoted here as 201-1, and one or more memory blocks in each identified memory device that will be involved in the dynamic repartitioning of the physical memory map(s) 112. The subset of memory devices 201-1, in some embodiments, corresponds to an example embodiment of a first subset of the memory devices 108 of FIG. 1. The data stored at the identified memory blocks is to be temporarily relocated during the dynamic repartitioning.

At block 204, data stored at the memory blocks of the memory devices 201-1 that are identified in the dynamic repartition indication is temporarily relocated to another memory device or mass storage device. In some embodiments, upon relocating this data, the identified memory blocks of the memory devices 201-1 are erased (by writing, for example, binary zeros into each of the identified memory blocks). In other embodiments, relocating the data is performed by copying the data to another memory device or mass storage device without erasing the data from the memory devices 201-1.

At block 206, the relocated data from the identified memory blocks of the memory devices 201-1 is stored at one or more of the mass storage devices 110 or a subset of memory devices, denoted here as 201-2. The subset of memory devices 201-2, in some embodiments, corresponds to an example embodiment of a second subset of the memory devices 108 of FIG. 1 that is different from the first subset of the memory devices 108 to which the subset of memory devices 201-1 corresponds. That is, in some embodiments, memory devices 201-2 correspond to one or more of the memory devices 108 that were not identified in the dynamic repartition indication.

At block 208, the processor(s) 102 cause the processing system 100 to be reconfigured. According to various examples, the system reconfiguration includes one or more of an ECC reconfiguration, an interleaving reconfiguration, or another reconfiguration of the system that requires the physical memory address mapping (that is, the mapping(s) defined in the physical memory map(s) 112) of the processing system 100 to be repartitioned.

At block 210, one or more physical address mappings defined in the physical memory map(s) 112 are repartitioned in accordance with the system reconfiguration. For example, if the system reconfiguration is an interleaving reconfiguration, an existing interleaving pattern (such as the example fine-grained and course-grained interleaving patterns described with reference to FIGS. 3 and 4 below) used to map physical addresses to physical memory blocks is changed to a new interleaving pattern (such as the example fine-grained and course-grained interleaving patterns described with reference to FIGS. 3 and 4 below), and one or more of the physical address mappings defined in the physical memory map(s) 112 are modified to correspond to the new interleaving pattern. For example, if the system reconfiguration is an ECC reconfiguration, one or more of the physical address mappings defined in the physical memory map(s) 112 are modified to correspond to ECC being enabled or disabled or the ECC scheme being changed for one or more of the memory devices 201-1. The physical address mappings that are repartitioned at block 210 correspond to the memory blocks identified in the dynamic repartition indication, from which data is relocated at block 204.

At block 212, after the physical address mappings defined in the physical memory map(s) 112 are repartitioned, the relocated data stored at one or more of the mass storage devices 110 or the memory devices 201-2 is loaded back onto the memory devices 201-1 in accordance with the repartitioned physical address mappings. In some embodiments, instead of moving the relocated data back into the memory devices 201-1 at block 212, the relocated data instead remains stored in the memory devices 201-2 and the memory devices 201-1 remain empty except for new memory allocations. In some embodiments, the relocated data is moved back onto the memory devices 201-1 from the memory devices 201-2 opportunistically, instead of during the reconfiguration process. In the present example, repartitioning the physical memory map(s) 112 advantageously does not require the processing system 100 to be rebooted. At block 214, the memory devices 201-1 store the previously relocated data in accordance with the new physical address mappings.

Figure 3:
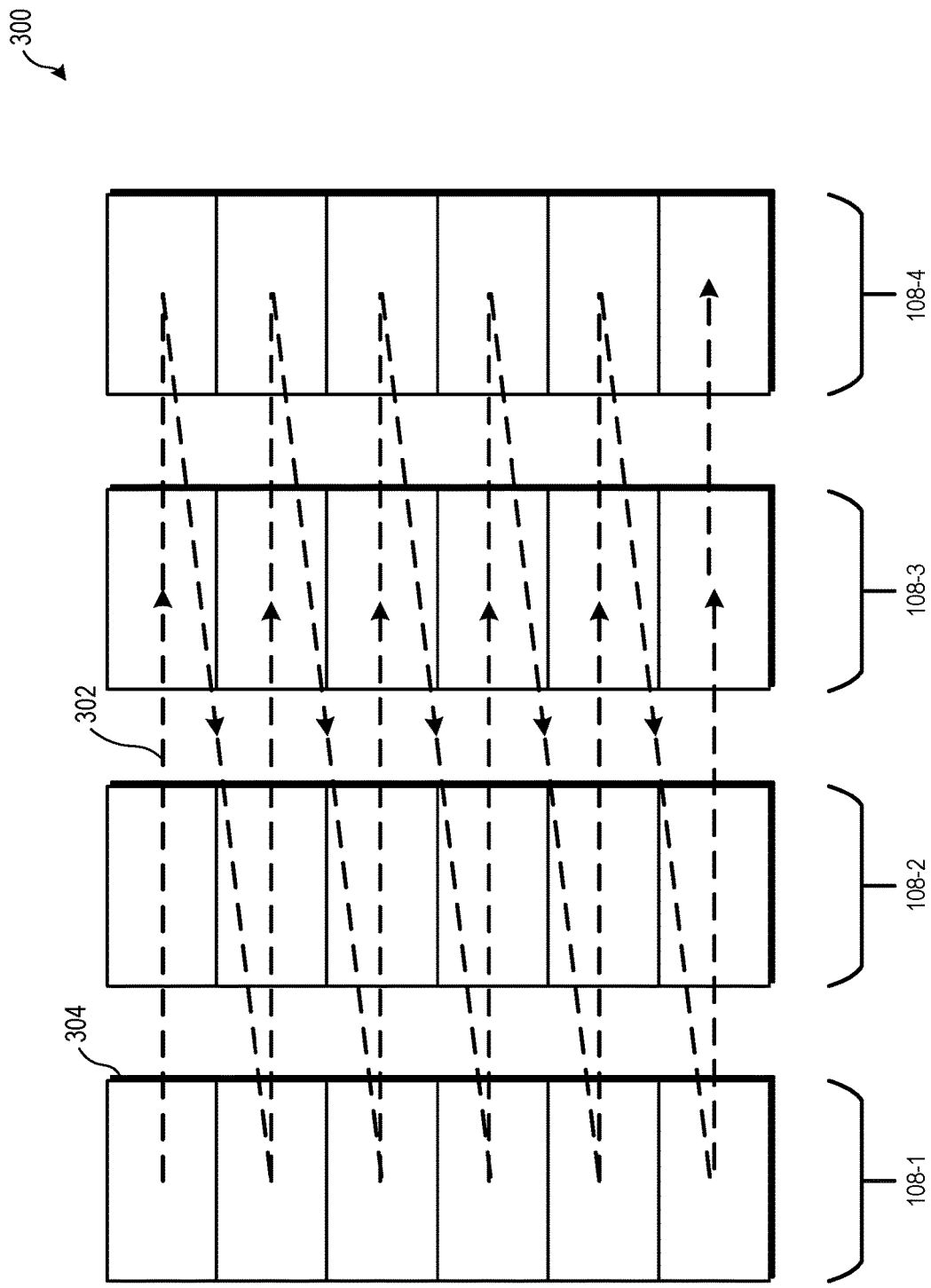
FIG. 3 is a block diagram illustrating a fine-grain interleaving pattern used to store data across memory devices, in accordance with some embodiments.

FIG. 3 is a diagram 300 illustrating a fine-grain interleaving pattern for accessing four memory devices in a processing system, such as the processing system 100 of FIG. 1. In the present example, the fine-grain interleaving pattern is applied to the memory devices 108-1, 108-2, 108-3, and 108-4. A path 302 represents the order in which data is written into memory blocks, such as the memory block 304, of the memory devices 108-1 through 108-4 in accordance with the fine-grain interleaving pattern. The illustrated fine-grain interleaving pattern is one example of an interleaving configuration that is defined in an embodiment of the interleaving configuration data 116, for example. In some embodiments, dynamic repartitioning of the physical memory address mapping of the processing system 100 is performed in connection with changing the interleaving configuration of the processing system 100 to or from the fine-grain interleaving pattern of the present example, or another similar fine-grain interleaving pattern.

For example, when data is sent for storage in the memory devices 108-1 through 108-4, the data is divided into blocks and contiguous blocks are stored successively in the memory devices 108-1 through 108-4. Here, "contiguous" blocks of data refer to contiguous sections of data within an ordered array of data of a data set (e.g., a file) that are to be stored at contiguous physical memory addresses. As an example, a data file that is to be stored by the processing system 100 and that is arranged as an ordered array of data is logically divided into blocks of data, with the blocks of data being designated for storage over a range of contiguous physical memory addresses such that a first block of data is stored at a first physical memory address and a second block of data that is contiguous with the first block of data is stored at a second memory address that is contiguous with the first physical memory address. When the processing system 100 is configured to implement a fine-grain interleaving pattern for the first and second physical memory addresses, the first block of data and the second block of data are stored at respectively different memory devices of the memory devices 108 in accordance with the fine-grain interleaving pattern, despite being contiguous blocks of data and despite being stored at contiguous physical memory addresses.

For example, if five contiguous blocks of data that would fill five blocks of memory are to be stored in the memory devices 108-1 through 108-4, the five blocks of data are stored respectively and consecutively in the first memory block of the memory device 108-1, in the first memory block of the memory device 108-2, in the first memory block of the memory device 108-3, in the first memory block of the memory device 108-4, and in the second memory block of the memory device 108-1. Generally, fine-grain interleaving provides quick access to memory devices by a processor that is capable of accessing all of the memory devices 108-1 through 108-4 with similar access speeds.

Figure 4:
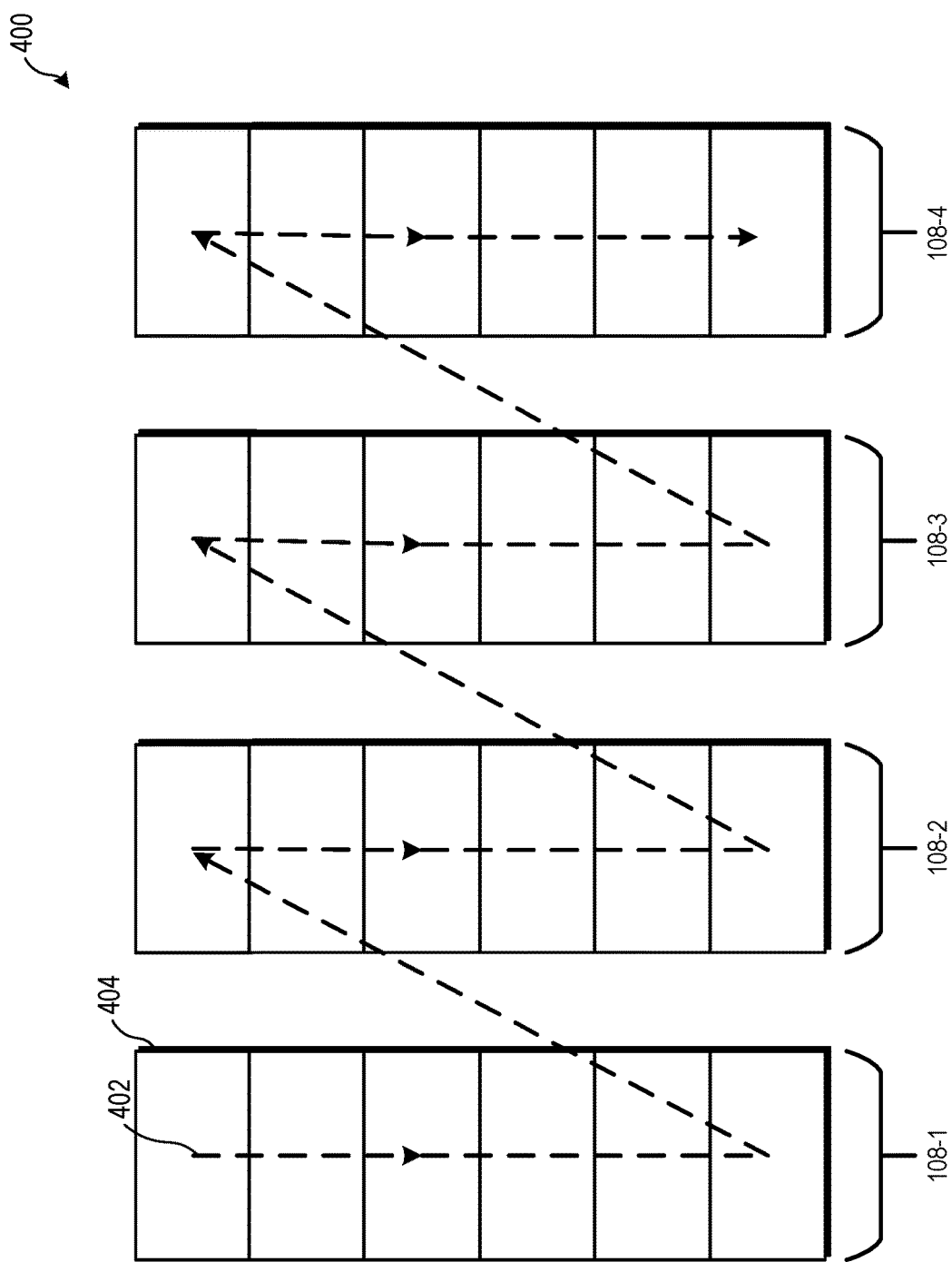
FIG. 4 is a block diagram illustrating a coarse-grain interleaving pattern used to store data across memory devices, in accordance with some embodiments.

FIG. 4 is a diagram 400 illustrating a coarse-grain interleaving pattern for accessing four memory devices in a processing system, here corresponding to an embodiment of the processing system 100 of FIG. 1. In the present example, the coarse-grain interleaving pattern is applied to memory devices 108-1, 108-2, 108-3, and 108-4. A path 402 represents the order in which data is written into memory blocks, such as the memory block 404, of the memory devices 108-1 through 108-4 in accordance with the coarse-grain interleaving pattern. The illustrated coarse-grain interleaving pattern is one example of an interleaving configuration that is defined in an embodiment of the interleaving configuration data 116, for example. In some embodiments, dynamic repartitioning of the physical memory address mapping of the processing system 100 is performed in connection with changing the interleaving configuration of the processing system 100 to or from the coarse-grain interleaving-pattern of the present example, or another similar coarse-grain interleaving pattern.

For example, when data is sent for storage in the memory devices 108-1 through 108-4, the data is divided into blocks and contiguous blocks are stored to fill each of the memory devices 108-1 through 108-4 successively. That is, the processor(s) 102 fill a given memory device 108-1, for example, with data completely before storing data at the next memory device 108-2. Typically, coarse-grain interleaving is advantageous for processors that cannot access multiple memory devices in parallel with similar access speeds.

Figure 5:
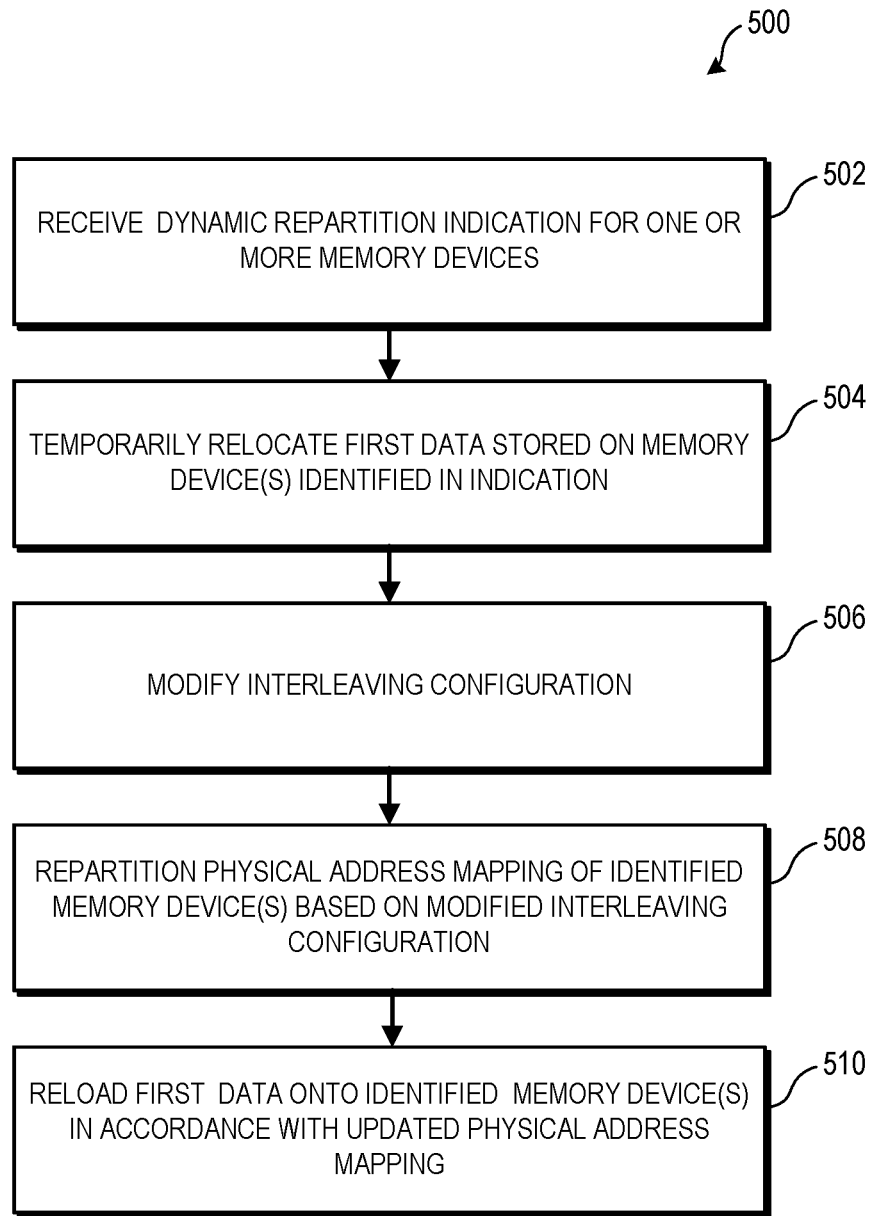
FIG. 5 is a flow diagram illustrating a method of dynamically repartitioning a memory physical address mapping for one or more memory devices and modifying an interleaving configuration of the one or more memory devices, in accordance with some embodiments.

FIG. 5 illustrates a method 500 of dynamically repartitioning a physical memory address mapping for a processing system in connection with modifying an interleaving configuration of a processing system. For ease of illustration, the method 500 is described with respect to an example implementation of the processing system 100 of FIG. 1 and its constituent components and modules.

At block 502, the processor(s) 102 receive a dynamic repartition indication, such as an embodiment of the dynamic repartition indication 118. In the present example, the dynamic repartition indication is generated as part of an interleaving reconfiguration that is to be executed by the processor(s) 102. Here, the dynamic repartition indication identifies a first subset of memory devices of the memory devices 108 and one or more memory blocks in each identified memory device that will be involved in the dynamic repartitioning of the physical memory map(s) 112. The data stored at the identified memory blocks is to be temporarily relocated during the dynamic repartitioning.

At block 504, data stored at the memory blocks of the first subset of memory devices that are identified in the dynamic repartition indication is temporarily relocated to one or more mass storage devices of the mass storage devices 110, to one or more memory devices of a second subset of memory devices of the memory devices 108 that were not identified in the dynamic repartition indication, or a combination of these. In some embodiments, upon relocating this data, the identified memory blocks of the first subset of memory devices 108 are erased (by writing, for example, binary zeros into each of the identified memory blocks).

At block 506, the processor(s) 102 cause the interleaving configuration of the processing system 100 to be reconfigured. For example, the processor(s) 102 update the interleaving configuration data 116 that defines one or more interleaving patterns according to which physical memory addresses are to be distributed across memory blocks of one or more of the memory devices 108 (i.e., across the identified memory blocks of the first subset of memory devices identified in the dynamic repartition indicator, in the present example).

At block 508, one or more physical address mappings defined in the physical memory map(s) 112 are repartitioned in accordance with the updated interleaving configuration. In some embodiments, an existing interleaving pattern used to map physical addresses to physical memory blocks is changed to a new interleaving pattern, and one or more of the physical address mappings defined in the physical memory map(s) 112 are modified to correspond to the new interleaving pattern. The physical address mappings that are repartitioned at block 508 correspond to the memory blocks identified in the dynamic repartition indication, from which data is relocated at block 504. In the present example, repartitioning the physical memory map(s) 112 advantageously does not require the processing system 100 to be rebooted.

At block 510, after the physical address mappings defined in the physical memory map(s) 112 are repartitioned, the relocated data is loaded back onto the first subset of memory devices of the memory devices 108 in a pattern corresponding to the repartitioned physical address mappings (i.e., corresponding to the new interleaving pattern). In some embodiments, instead of moving the relocated data back onto the first subset of memory devices at block 510, the relocated data instead remains stored on the second subset of memory devices and the first subset of memory devices remain empty except for new memory allocations. In some embodiments, the relocated data is moved back onto the first subset of memory devices from the second subset of memory devices opportunistically, instead of during the reconfiguration process.

Figure 6:
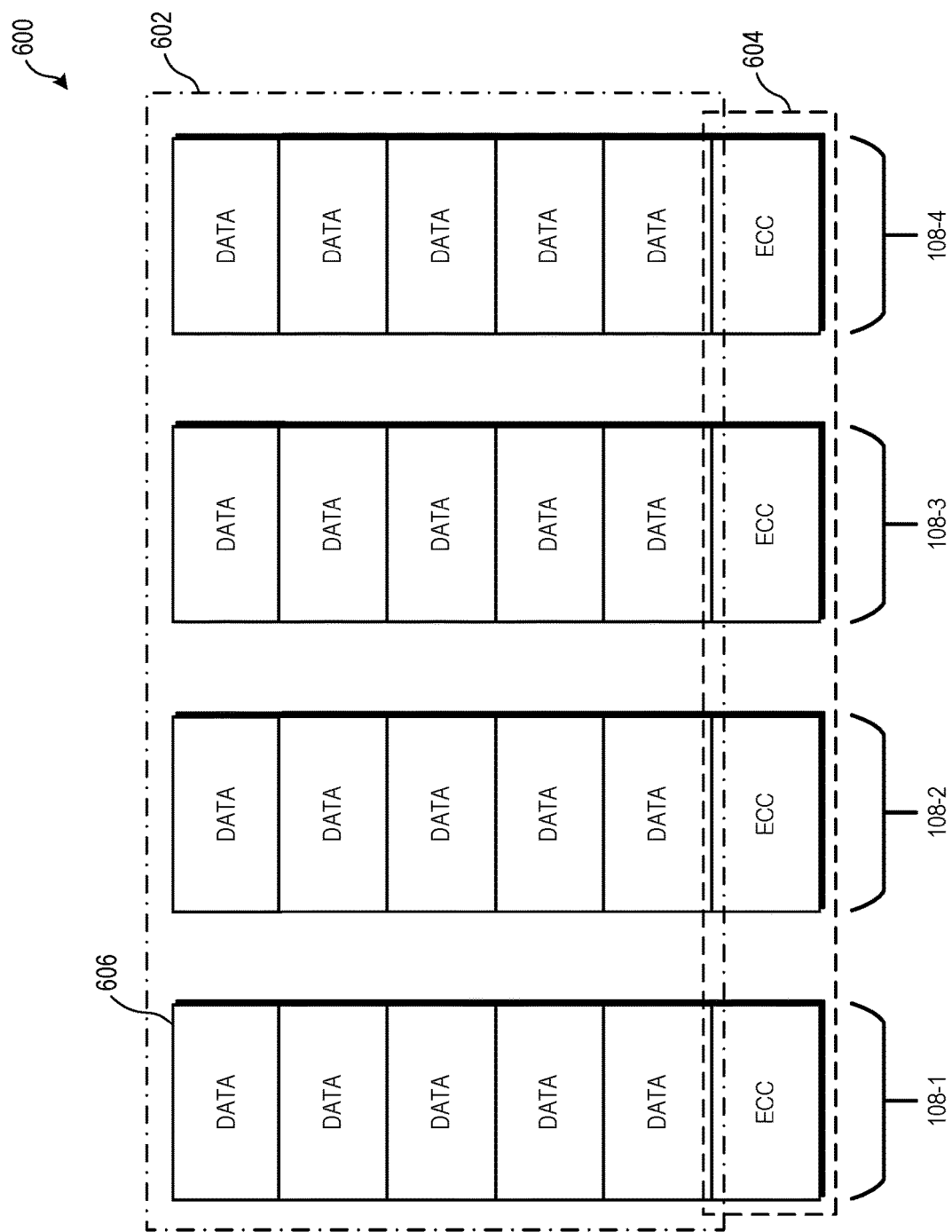
FIG. 6 is a block diagram illustrating memory devices having memory blocks reserved for storing error correcting code (ECC) per an ECC configuration, in accordance with some embodiments.

FIG. 6 is a block diagram illustrating an ECC-enabled configuration for four memory devices in a processing system, here corresponding to an embodiment of the processing system 100 of FIG. 1. In the present example, the ECC configuration (which can be specified in the ECC configuration data 114) of the processing system 100 causes the memory devices 108-1, 108-2, 108-3, and 108-4 to be ECC-enabled. That is, memory blocks 602 of the memory devices 108-1 through 108-4 are available for storing data such as user data, job data, operating system data, and the like, while memory blocks 604 of the memory devices 108-1 through 108-4 are reserved for exclusively storing ECC data, used to detect and correct errors in the data stored in the memory blocks 602. In some embodiments, an ECC reconfiguration of the processing system 100 is performed (by, for example, the processor(s) 102), which changes the number of memory blocks of the memory devices 108-1 through 108-4 that are reserved for storing ECC data. In some embodiments, such an ECC reconfiguration disables ECC for the memory devices 108-1 through 108-4, resulting in the memory blocks 604 no longer being reserved for storing ECC data, and instead being made available for storing other types of data. As described above, changing the ECC configuration of one or more of the memory devices 108 typically requires the physical memory map(s) 112 to be repartitioned.

Figure 7:
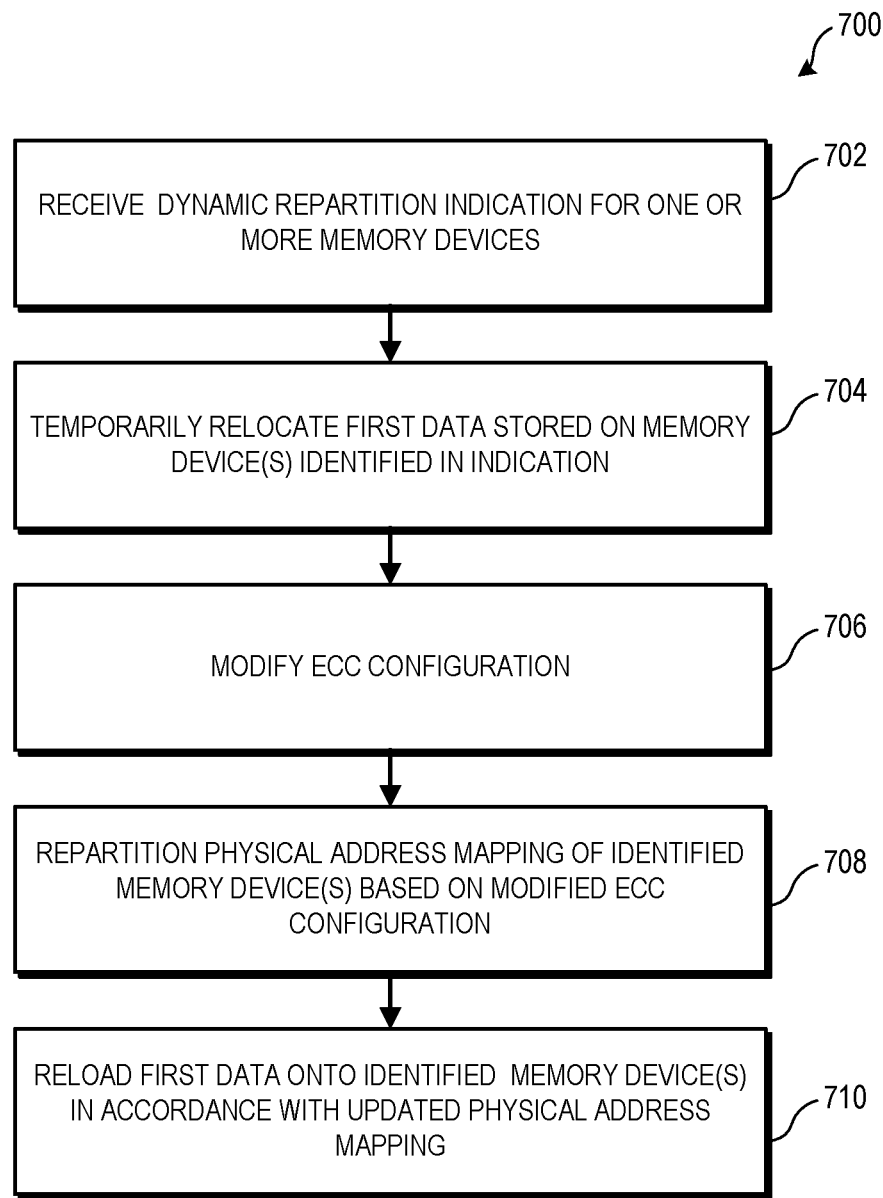
FIG. 7 is a flow diagram illustrating a method of dynamically repartitioning a memory physical address mapping for one or more memory devices and modifying an ECC configuration associated with the one or more memory devices, in accordance with some embodiments.

FIG. 7 shows a method 700 of dynamically repartitioning a physical memory address mapping for a processing system in connection with modifying an ECC configuration of the processing system. The method 700 is described with respect to an example implementation of the processing system 100 of FIG. 1 and its constituent components and modules.

At block 702, the processor(s) 102 receive a dynamic repartition indication, such as an embodiment of the dynamic repartition indication 118. In the present example, the dynamic repartition indication is generated as part of an ECC reconfiguration that is to be executed by the processor(s) 102. Here, the dynamic repartition indication identifies a first subset of memory devices of the memory devices 108 and one or more memory blocks in each identified memory device that will be involved in the dynamic repartitioning of the physical memory map(s) 112. The data stored at the identified memory blocks is to be temporarily relocated during the dynamic repartitioning.

At block 704, data stored at the memory blocks of the first subset of memory devices that are identified in the dynamic repartition indication is temporarily relocated to one or more mass storage devices of the mass storage devices 110, to one or more memory devices of a second subset of memory devices of the memory devices 108 that were not identified in the dynamic repartition indication, or a combination of these. In some embodiments, upon relocating this data, the identified memory blocks of the first subset of memory devices 108 are erased (by writing, for example, binary zeros into each of the identified memory blocks).

At block 706, the processor(s) 102 cause the ECC configuration of the processing system 100 to be reconfigured. For example, the processor(s) 102 update the ECC configuration data 114 that defines which memory blocks of the memory devices 108 are reserved for storing ECC data. In some embodiments, the updates to the ECC configuration data 114 involve reserving new memory blocks of the identified first set of memory devices for storing ECC data. In some embodiments, the updates to the ECC configuration data involve canceling one or more existing reservations of memory blocks of the identified first set of memory devices, making such memory blocks available for storing data other than ECC data.

At block 708, one or more physical address mappings defined in the physical memory map(s) 112 are repartitioned in accordance with the updated ECC configuration (e.g., as described in the examples above). The physical address mappings that are repartitioned at block 708 correspond to the memory blocks identified in the dynamic repartition indication, from which data is relocated at block 704. In the present example, repartitioning the physical memory map(s) 112 advantageously does not require the processing system 100 to be rebooted.

At block 710, after the physical address mappings defined in the physical memory map(s) 112 are repartitioned, the relocated data is loaded back onto the first subset of memory devices of the memory devices 108 in a pattern corresponding to the repartitioned physical address mappings (i.e., corresponding to the ECC configuration). In some embodiments, instead of moving the relocated data back onto the first subset of memory devices at block 710, the relocated data instead remains stored on the second subset of memory devices and the first subset of memory devices remain empty except for new memory allocations. In some embodiments, the relocated data is moved back onto the first subset of memory devices from the second subset of memory devices opportunistically, instead of during the reconfiguration process.

Figure 8:
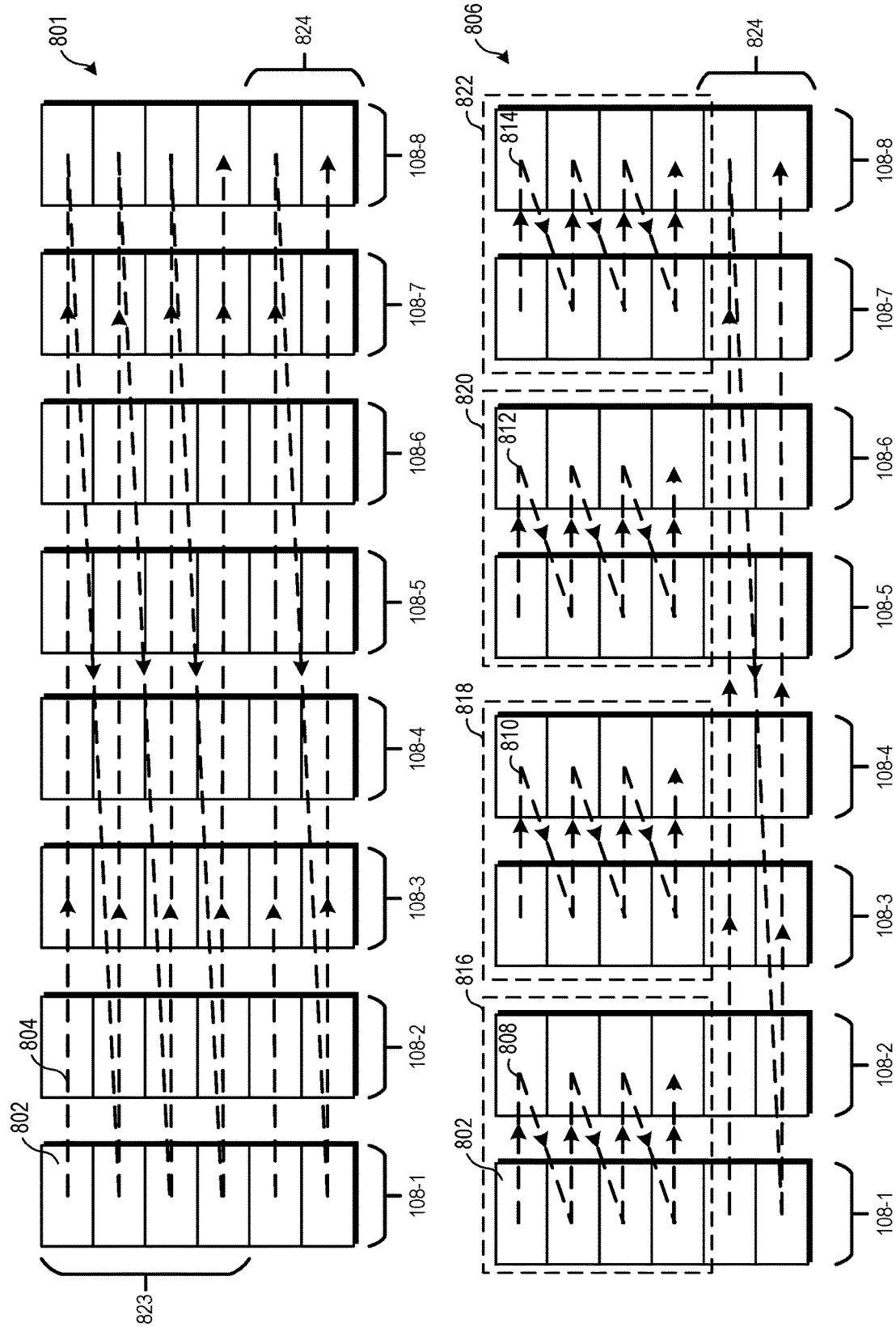
FIG. 8 is a block diagram illustrating fine-grain-based dynamic repartitioning of multiple memory devices of a processing system, in accordance with some embodiments.

In some embodiments, one or more memory blocks of a given memory device are reserved for critical data, such as OS data or page table data, and cannot be dynamically repartitioned. FIG. 8 is a block diagram illustrating an example, corresponding to an embodiment of the processing system 100 of FIG. 1, in which the physical address mappings for all of the memory devices 108 are dynamically repartitioned, with a subset of the memory blocks in each of the memory devices 108 being omitted from the dynamic repartitioning because they are reserved for critical data storage.

As shown in the present example, prior to dynamic repartitioning, the memory devices 108 are in a first interleaving configuration 801, such data is to be stored in memory blocks, such as the memory block 802, of the memory devices 108-1 through 108-8 according to a fine-grain interleaving pattern, represented by a path 804. Here, a first set of memory blocks 823 are designated for storing non-critical data, such as job data or user data, while the second set of memory blocks 824 are designated for storing critical data, such as OS data or page table data. Accordingly, dynamic repartitioning of physical memory addresses is enabled for the first set of memory blocks 823 and their corresponding physical memory addresses and is disabled for the second set of memory blocks 824 and their corresponding physical memory addresses.

For example, when the processor(s) 102 execute dynamic repartitioning for the memory devices 801 to change the interleaving configuration of the memory devices 108 from the first interleaving configuration 801 to a second interleaving configuration 806, only the data (e.g., non-critical data) stored in the first set of memory blocks 823 is relocated, while the data (e.g., critical data) stored in the second set of memory blocks 824 is not relocated. Because dynamic repartitioning of physical memory addresses is disabled for the second set of memory blocks 824, the interleaving pattern applied at the second set of memory blocks 824 does not change during such dynamic repartitioning.

The data stored on the first set of memory blocks 823 is relocated (by, for example, the processor(s) 102) to one or more other memory devices, to one or more of the mass storage devices 110, or a combination of these. The processor(s) 102 then repartition the physical memory map(s) 112 and modify the interleaving configuration data 116 in accordance with new interleaving patterns to be applied at the first set of memory blocks 823 in the second interleaving configuration 806. In the present example, repartitioning the physical memory map(s) 112 advantageously does not require the processing system 100 to be rebooted. The temporarily relocated data is then stored at the first set of memory blocks 823 in accordance with the second interleaving configuration 806.

In the present example, the processor(s) logically divide the first set of memory blocks 823 into domains 816, 818, 820, and 822 (each respectively corresponding, for example, to domains 120, 122, 124, and 126). In the second interleaving configuration 806, a fine-grain interleaving pattern is applied within each of the domains 816, 818, 820, and 822. That is, a first fine-grain interleaving pattern corresponding to a first path 808 is applied at the memory blocks of the memory devices 108-1 and 108-2 included in the first set of memory blocks 823. A second fine-grain interleaving pattern corresponding to a second path 810 is applied at the memory blocks of the memory devices 108-3 and 108-4 included in the first set of memory blocks 823. A third fine-grain interleaving pattern corresponding to a third path 812 is applied at the memory blocks of the memory devices 108-5 and 108-6 included in the first set of memory blocks 823. A fourth fine-grain interleaving pattern corresponding to a fourth path 814 is applied at the memory blocks of the memory devices 108-7 and 108-8 included in the first set of memory blocks 823. Since the second set of memory blocks 823 were not dynamically repartitioned, their corresponding interleaving pattern remains unchanged in the second interleaving configuration 806. By disabling dynamic repartitioning of the physical memory address mapping for critical memory blocks in this way, associated risks of failure of operation of the processing system 100 are mitigated or altogether avoided.

Figure 9:
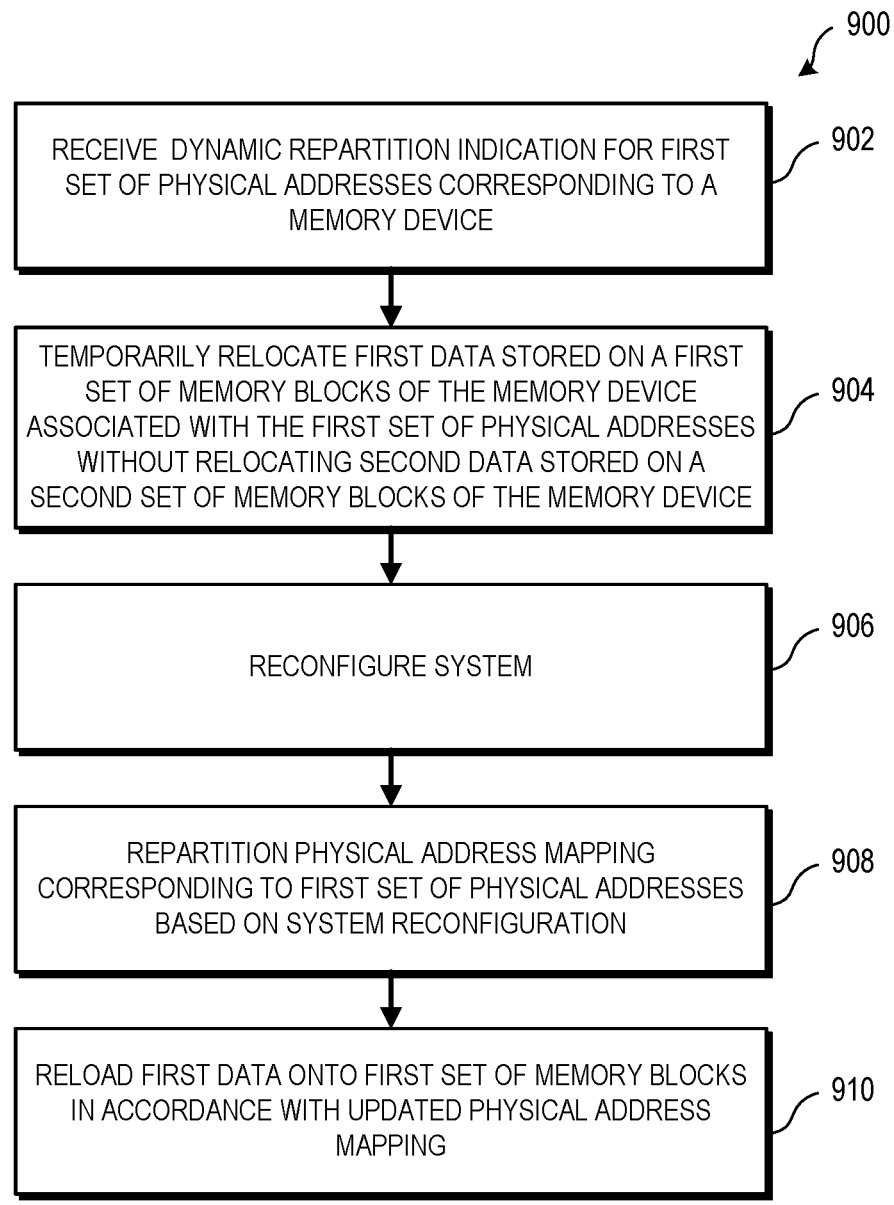
FIG. 9 is a flow diagram illustrating a method for dynamically repartitioning a memory physical address mapping for only a portion of the memory blocks within a given memory device, in accordance with some embodiments.

FIG. 9 illustrates a method 900 of dynamically repartitioning a physical memory address mapping in which only a portion of the memory blocks within a given memory device are relocated. The method 900 is described with respect to an example implementation of the processing system 100 of FIG. 1 and its constituent components and modules.

At block 902, the processor(s) 102 receive a dynamic repartition indication, such as an embodiment of the dynamic repartition indication 118. In the present example, the dynamic repartition indication is generated as part of an interleaving reconfiguration that is to be executed by the processor(s) 102. Here, the dynamic repartition indication identifies a set of physical addresses corresponding to a first set of memory blocks of a memory device of the memory devices 108 that will be involved in the dynamic repartitioning of the physical memory map(s) 112. In the present example, the memory device includes a second set of memory blocks that are not identified in the dynamic repartition indication. In some embodiments, one or more memory blocks of the second set of memory blocks are reserved for storing critical data, and dynamic repartitioning of the physical memory addresses associated with such memory blocks is disabled. Data stored at the first set of memory blocks associated with the identified set of physical addresses is to be temporarily relocated during the dynamic repartitioning.

At block 904, data stored at the first set of memory blocks of is temporarily relocated to one or more mass storage devices of the mass storage devices 110, to one or more other memory devices of the memory devices 108, or a combination of these. In some embodiments, upon relocating this data, the memory blocks of the first set of memory blocks are erased (by writing, for example, binary zeros into each of the memory blocks of the first set of memory blocks). Data stored at the second set of memory blocks is not relocated at block 904 because dynamic reconfiguration of the physical memory address mapping is not performed for the second set of memory blocks.

At block 906, the processor(s) 102 cause the processing system 100 to be reconfigured. According to various examples, the system reconfiguration includes one or more of an ECC reconfiguration, an interleaving reconfiguration, or another reconfiguration of the system that requires the physical memory address mapping (i.e., the mapping(s)) defined in the physical memory map(s) 112) of the processing system 100 to be repartitioned.

At block 908, one or more physical address mappings defined in the physical memory map(s) 112 are repartitioned in accordance with the system reconfiguration. For example, if the system reconfiguration is an interleaving reconfiguration, an existing interleaving pattern used to map physical addresses to the first set of memory blocks is changed to a new interleaving pattern, and one or more of the physical address mappings defined in the physical memory map(s) 112 are modified to correspond to the new interleaving pattern. For example, if the system reconfiguration is an ECC reconfiguration, one or more of the physical address mappings defined in the physical memory map(s) 112 are modified to correspond to ECC being enabled or disabled or the ECC scheme being changed for one or more of the first set of memory blocks. The physical address mappings that are repartitioned at block 908 correspond to the physical addresses identified in the dynamic repartition indication. In the present example, repartitioning the physical memory map(s) 112 advantageously does not require the processing system 100 to be rebooted. At block 910 after the physical address mappings defined in the physical memory map(s) 112 are repartitioned, the relocated data is loaded back onto the first set of memory blocks of the memory device in accordance with the repartitioned physical address mappings.

In some embodiments, the apparatus and techniques described above are implemented in a system including one or more integrated circuit (IC) devices (also referred to as integrated circuit packages or microchips), such as the processing system 100 described above with reference to FIG. 1. Electronic design automation (EDA) and computer-aided design (CAD) software tools may be used in the design and fabrication of these IC devices. These design tools typically are represented as one or more software programs. The one or more software programs include code executable by a processing system to manipulate the processing system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer-readable storage medium may include any non-transitory storage medium, or combination of non-transitory storage media, accessible by a processing system during use to provide instructions and/or data to the processing system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the processing system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   relocating first data out of a first set of memory blocks of a first memory device of a processing system to a selected one of a second memory device or a mass storage device responsive to receiving an indicator identifying the first set of memory blocks of the first memory device;
   repartitioning at least one physical memory map associated with the first set of memory blocks of the first memory device to produce at least one repartitioned physical memory map representing a relocation of the first data to a second set of memory blocks; and
   storing the first data at the second set of memory blocks based on the at least one repartitioned physical memory map.

2. The method of claim 1, wherein repartitioning the at least one physical memory map is performed in conjunction with a change in a system configuration of the processing system.

3. The method of claim 2, wherein the change in the system configuration corresponds to a change in an error correcting code (ECC) configuration of the processing system, wherein the ECC configuration identifies ECC memory blocks that are reserved for storing ECC data.

4. The method of claim 2, wherein the change in the system configuration corresponds to a change in an interleaving configuration of the processing system, wherein the interleaving configuration defines at least one interleaving pattern according to which data is to be stored on at least the first set of memory blocks.

5. The method of claim 1, wherein repartitioning the at least one physical memory map comprises:
   changing a mapping defined by the at least one physical memory map for a first physical address, wherein the at least one physical memory map maps the
   first physical address to a first memory block of the first set of memory blocks, and the at least one repartitioned physical memory map maps the first physical address to a second memory block of the second set of memory blocks.

6. The method of claim 1, wherein repartitioning the at least one physical memory map is performed without requiring a reboot of the processing system that includes the first memory device.

7. A processing system comprising:
   a plurality of memory devices including a first memory device having a first set of memory blocks; and
   at least one processor configured to execute instructions that manipulate the at least one processor to:
   relocate first data out of the first set of memory blocks of the first memory device, responsive to an indicator that identifies the first set of memory blocks;
   repartition at least one physical memory map associated with the first set of memory blocks of the first memory device to produce at least one repartitioned physical memory map representing a relocation of the first data to a second set of memory blocks of the plurality of memory devices; and
   store the first data at the second set of memory blocks based on the at least one repartitioned physical memory map.

8. The processing system of claim 7, wherein the instructions manipulate the at least one processor to:
   repartition the at least one physical memory map in conjunction with a change in a system configuration of the processing system.

9. The processing system of claim 8, wherein the change in the system configuration corresponds to a change in an error correcting code (ECC) configuration of the processing system, wherein the ECC configuration identifies ECC memory blocks of the plurality of memory devices that are reserved for storing ECC data.

10. The processing system of claim 8, wherein the change in the system configuration corresponds to a change in an interleaving configuration of the processing system, wherein the interleaving configuration defines at least one interleaving pattern according to which data is to be stored on memory blocks of the plurality of memory devices, the memory blocks including at least the first set of memory blocks.

11. The processing system of claim 10, wherein the change in the interleaving configuration corresponds to replacing a first interleaving pattern with a second interleaving pattern, and the at least one repartitioned physical memory map reflects the second interleaving pattern.

12. The processing system of claim 7, wherein to repartition the at least one physical memory map, the instructions manipulate the at least one processor to:
   change a mapping defined by the at least one physical memory map for a first physical address, wherein the at least one physical memory map maps the first physical address to a first memory block of the first set of memory blocks and the at least one repartitioned physical memory map maps the first physical address to a second memory block of the second set of memory blocks.

13. The processing system of claim 7, further comprising:
a second memory device of the plurality of memory devices; and
a mass storage device, wherein the instructions manipulate the at least one processor to relocate the first data to a selected one of the second memory device or the mass storage device.

14. The processing system of claim 7, wherein the instructions manipulate the at least one processor to:
repartition the at least one physical memory map without requiring a reboot of the processing system.

15. A system comprising:
a first memory device having a first memory block at which first data is stored; and
at least one processor configured to execute instructions that manipulate the at least one processor to:
transfer first data out of the first memory block in response to an indicator that identifies at least the first memory block;
repartition a physical memory map associated with the first memory block to produce a repartitioned physical memory map without requiring a reboot of the system, the repartitioned physical memory map representing a relocation of the first data to a second memory block of the first memory device; and
store the first data at the second memory block based on the repartitioned physical memory map.

16. The system of claim 15, wherein the instructions further manipulate the at least one processor to:
repartition the physical memory map in conjunction with a change in a system configuration of the system.

17. The system of claim 16, wherein the change in the system configuration corresponds to a change in an error correcting code (ECC) configuration of the system, wherein the ECC configuration identifies ECC memory blocks of the first memory device that are reserved for storing ECC data.

18. The system of claim 16, wherein the change in the system configuration corresponds to a change in an interleaving configuration of the system, wherein the interleaving configuration defines at least one interleaving pattern according to which data is to be stored on a plurality of memory blocks including the first memory block and the second memory block.

19. The system of claim 15, wherein, to repartition the physical memory map, the instructions manipulate the at least one processor to:
change a mapping defined by the physical memory map for a first physical address, wherein the physical memory map associates the first physical address with the first memory block and the repartitioned physical memory map associates the first physical address with the second memory block.

20. The system of claim 15, wherein the instructions further manipulate the at least one processor to:
prevent repartitioning of a third memory block in response to an indication that the third memory block stores critical data.

* * * * *